(12) United States Patent
Bono et al.

(10) Patent No.: US 9,997,796 B2
(45) Date of Patent: Jun. 12, 2018

(54) FUEL CELL SYSTEM AND OPERATING METHOD OF FUEL CELL SYSTEM

(71) Applicant: TOYOTA JIDOSHA KABUSHIKI KAISHA, Toyota-shi, Aichi-ken (JP)

(72) Inventors: Tetsuya Bono, Miyoshi (JP); Hiroyuki Imanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 413 days.

(21) Appl. No.: 14/930,941

(22) Filed: Nov. 3, 2015

(65) Prior Publication Data

US 2016/0133973 A1 May 12, 2016

(30) Foreign Application Priority Data

Nov. 12, 2014 (JP) ................................. 2014-230186

(51) Int. Cl.
*H01M 8/04* (2016.01)
*H01M 8/04992* (2016.01)
(Continued)

(52) U.S. Cl.
CPC ..... *H01M 8/04992* (2013.01); *B60L 11/1881* (2013.01); *H01M 8/0488* (2013.01);
(Continued)

(58) Field of Classification Search
None
See application file for complete search history.

(56) References Cited

U.S. PATENT DOCUMENTS

2010/0248054 A1* 9/2010 Umayahara ....... H01M 8/04089
429/432

FOREIGN PATENT DOCUMENTS

| JP | 2009-129639 | 6/2009 |
| JP | 2012-94257 A | 5/2012 |
| WO | WO2011-124954 A2 | 10/2011 |

OTHER PUBLICATIONS

Machine translation of JP 2009-129639, Nov. 2007.*

* cited by examiner

*Primary Examiner* — Jonathan Crepeau
(74) *Attorney, Agent, or Firm* — Finnegan, Henderson, Farabow, Garrett & Dunner, LLP

(57) ABSTRACT

The present invention provides a system for a fuel cell vehicle, capable of preventing an unnecessary error in calculating high potential avoidance power to calculate power for high potential avoidance with high accuracy. A fuel cell system 100 includes: a fuel cell 20 that receives the supply of reactant gas to generate power; a secondary battery 50 for storing part of the power generated by the fuel cell 20; calculation means 60 which, when surplus power for high potential avoidance is added to the output voltage of the fuel cell 20 to avoid a high potential, calculates high potential avoidance voltage to avoid the high potential by feedback control based on a deviation between power generation voltage of the fuel cell 20 and high potential avoidance target voltage; determination means 70 for determining whether the operating state of the fuel cell 20 corresponds to a prohibition condition A to prohibit updating of an integral term of the feedback control or a permission condition; and feedback control condition deciding means 80 for stopping the updating of the integral term when the operating state corresponds to the prohibition condition A or updating the integral term when the operating state corresponds to the permission condition.

5 Claims, 3 Drawing Sheets

(51) Int. Cl.
*H01M 8/04537* (2016.01)
*H01M 16/00* (2006.01)
*H02J 7/00* (2006.01)
*B60L 11/18* (2006.01)
*H01M 8/04858* (2016.01)
*H01M 8/1018* (2016.01)

(52) U.S. Cl.
CPC ..... *H01M 8/04559* (2013.01); *H01M 16/006* (2013.01); *H02J 7/007* (2013.01); *H01M 2008/1095* (2013.01); *H01M 2220/20* (2013.01); *H01M 2250/20* (2013.01); *Y02T 90/32* (2013.01)

FUEL CELL SYSTEM AND OPERATING METHOD OF FUEL CELL SYSTEM

BACKGROUND OF THE INVENTION

Field of the Invention

The present invention relates to a fuel cell system for performing high potential avoidance control to improve the durability of a fuel cell stack, and an operating method of the fuel cell system.

Background Art

A fuel cell stack is a power generation system which oxidizes fuel by an electrochemical process to directly convert, into electric energy, energy discharged with the oxidizing reaction. The fuel cell stack has a membrane electrode assembly in which both side surfaces of a polymer electrolyte membrane for selectively transporting hydrogen ions are sandwiched and held by a pair of electrodes made of a porous material. Each of the pair of electrodes has a catalyst layer which comes in contact with the polymer electrolyte membrane, the catalyst layer containing, as a main component, carbon powder which carries a platinum-based metal catalyst, and a gas diffusion layer formed on the surface of the catalyst layer and having both air permeability and electron conductivity.

In a fuel cell vehicle in which a fuel cell system is mounted as a power source, the fuel cell stack is made to generate power in a high power range with good generating efficiency to supply power to a traction motor from both the fuel cell stack and a secondary battery or only from the fuel cell stack. On the other hand, in a low power range with poor generating efficiency, operation control is so performed that the power generation of the fuel cell stack will be temporarily halted to supply power to the traction motor only from the secondary battery. The temporary halting of the operation of the fuel cell stack in a low load range where the power generation efficiency of the fuel cell system is low is called an intermittent operation. In the low load range where the power generation efficiency of the fuel cell system is lowered, the intermittent operation can be performed to operate the fuel cell stack in a range with high energy conversion efficiency, and this can increase the efficiency of the entire fuel cell system.

In the fuel cell system, high potential avoidance control is performed to improve the durability of the fuel cell stack. For example, Patent Document 1 discloses a fuel cell system including a fuel cell that receives the supply of reactant gas to generate power; and a controller for performing high potential avoidance control on the output voltage of the fuel cell by setting high potential avoidance voltage lower than the open end voltage thereof as an upper limit. When part of power generated by the fuel cell is stored in a secondary battery, the fuel cell system performs feedback control on the charging/discharging of the secondary battery in consideration of the amount of power stored in the secondary battery. In this case, when the high potential avoidance control is prohibited, the feedback control is allowed, while when high potential control is allowed, the feedback control is prohibited to avoid error integration of an integral term of the feedback control due to the storage of power in excess of the required power of the secondary battery.

CITATION LIST

Patent Document

[Patent Document 1] JP 2009-129639 A

SUMMARY OF THE INVENTION

In the feedback control of the fuel cell system in Patent Document 1, when the present voltage of the fuel cell is lower than high potential avoidance target voltage, it is determined that high voltage avoidance power is sufficiently high, and an operation for reducing the high potential avoidance power is performed to calculate the integral term of the feedback control. Suppose that the decrease in present voltage is due to a temporary change in power generation state, rather than the effect of the high potential avoidance power. In this case, however, if the high potential avoidance power is reduced, sufficient high potential avoidance power cannot be applied when the power generation state is restored, resulting in the generation of a high potential.

The present invention has been devised in view of the above circumstances, and it is an object thereof to provide a fuel cell system for performing high potential avoidance control to improve the durability of a fuel cell stack, and an operating method of the fuel cell system, where an unnecessary error in calculating high potential avoidance power in the fuel cell system can be prevented to calculate power for high potential avoidance with high accuracy.

In order to attain the object, a fuel cell system according to the present invention includes: a fuel cell that receives the supply of reactant gas to generate power; a secondary battery for storing part of the power generated by the fuel cell; calculation means which, when surplus power for high potential avoidance is added to the output of the fuel cell to avoid a high potential, calculates high potential avoidance voltage to avoid the high potential by feedback control based on a deviation between power generation voltage of the fuel cell and high potential avoidance target voltage; determination means for determining whether the operating state of the fuel cell corresponds to a prohibition condition to prohibit updating of an integral term of the feedback control or a permission condition; and feedback control condition deciding means for stopping the updating of the integral term when the operating state corresponds to the prohibition condition or updating the integral term when the operating state corresponds to the permission condition.

The prohibition condition to prohibit the updating of the integral term is any one of the following conditions that: required power for electric generation in the fuel cell system is higher than high potential avoidance power; the operating state is in an air deficiency state immediately after the stop of an intermittent operation; a vehicle is during regenerative braking or immediately after the stop of the regenerative braking; and the operating state is in the process of starting up the vehicle or immediately after the start-up process.

The operating method of a fuel cell system according to the present invention is an operating method for applying surplus power for high potential avoidance to power generation voltage of a fuel cell to avoid a high potential, including: calculating, by feedback control, high potential avoidance voltage for avoiding the high potential based on a deviation between power generation voltage of the fuel cell and high potential avoidance target voltage; determining whether the operating state of the fuel cell corresponds to a prohibition condition to prohibit updating of an integral term of the feedback control or a permission condition; and stopping the updating of the integral term when the operating state corresponds to the prohibition condition or updating the integral term when the operating state corresponds to the permission condition to perform feedback control in order to perform high potential avoidance control.

When a decrease in cell voltage is due to a temporary operating condition, rather than the effect of high potential avoidance power, the fuel cell system according to the present invention does not update the integral term of the feedback control. Therefore, an unnecessary error in calculating high potential avoidance power can be prevented to calculate power for high potential avoidance with high accuracy.

DESCRIPTION OF THE PREFERRED EMBODIMENT

Figure 1:
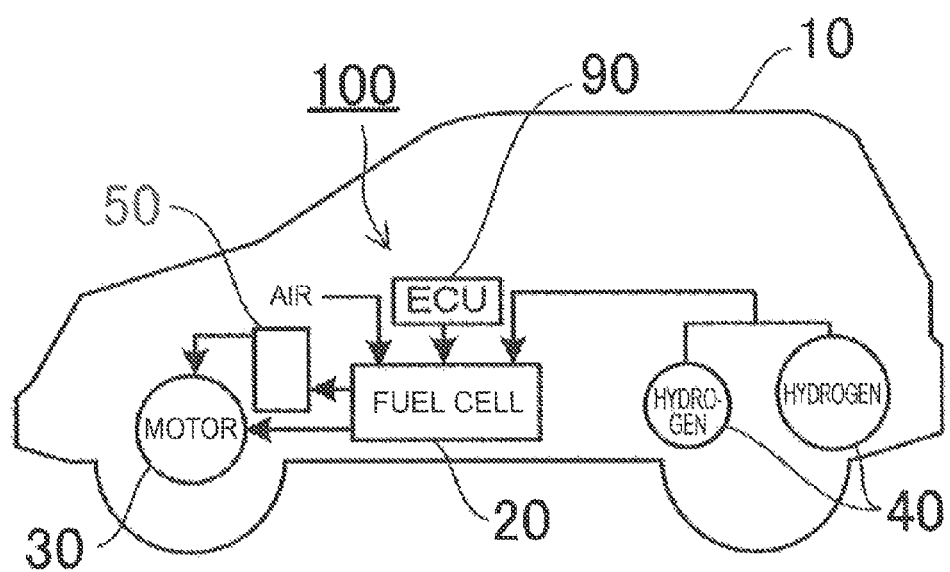
FIG. 1 is a schematic diagram of a fuel cell vehicle according to an embodiment of the present invention.

An embodiment of the present invention will be described below. In the following description of the drawings, the same or similar parts are denoted by the same or similar reference numerals. However, the drawings are schematic representations. Therefore, specific dimensions and the like should be determined in the light of the following description. Further, it is needless to say that respective drawings can contain differences in dimensional relationship or ratio from one another.

Figure 2:
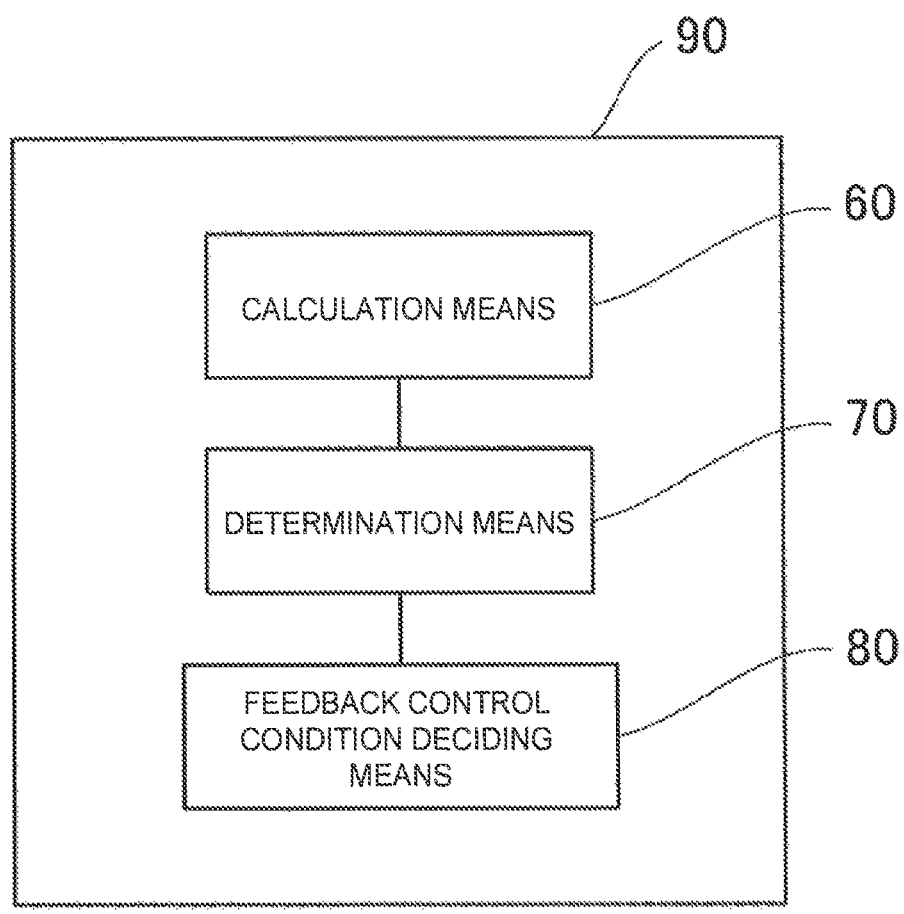
FIG. 2 is a block diagram of a fuel cell system according to the embodiment of the present invention.

Referring first to FIG. 1, a fuel cell system according to the embodiment of the present invention will be described. FIG. 1 is a schematic diagram of a fuel cell vehicle according to the embodiment of the present invention. FIG. 2 is a block diagram of the fuel cell system according to the embodiment of the present invention.

As shown in FIG. 1 and FIG. 2, a fuel cell system 100 functions as an in-vehicle power system mounted in a fuel cell vehicle 10, including a fuel cell 20, a secondary battery 50, calculation means 60, determination means 70, and feedback control condition deciding means 80.

The fuel cell 20 receives the supply of reactant gas (fuel gas and oxidizing gas) to generate power. The fuel cell vehicle 10 runs by driving a traction motor 30 and accessories, not shown, by electricity generated by the fuel cell 20. Note that the reference numeral 40 in FIG. 1 indicates a high-pressure hydrogen tank for storing hydrogen as fuel gas.

The fuel cell 20 has a stack structure in which multiple cells are stacked (where both the fuel cell stack and the multiple cells are not shown). For example, each of the cells of a solid polymer electrolyte fuel cell includes: at least a membrane electrode assembly (MEA), composed of an ion-permeable electrolyte membrane, and an anode-side catalyst layer (electrode layer) and a cathode-side catalyst layer (electrode layer) that sandwich the electrolyte membrane; and a gas diffusion layer for supplying fuel gas or oxidant gas to the membrane electrode assembly. Each cell of the stack structure of the fuel cell is sandwiched between a pair of separators.

The secondary battery 50 is a rechargeable battery for storing part of power generated by the fuel cell 20. The secondary battery 50 functions as a surplus power storage source, a regenerative energy storage source during regenerative braking, and an energy buffer during load fluctuation accompanied with acceleration or deceleration of the fuel cell vehicle 10. As the secondary battery 50, for example, a rechargeable battery, such as a nickel-cadmium rechargeable battery, a nickel-hydrogen rechargeable battery, or a lithium ion rechargeable battery, is suitable, but the secondary battery 50 is not limited to the battery exemplified.

The fuel cell 20 is controlled by an electronic control unit (ECU) 90. For example, the ECU 90 includes a CPU, a ROM, a RAM, and an I/O interface to execute a software program for implementing an operating method of the fuel cell system according to the present invention to implement the calculation means 60, the determination means 70, and the feedback control condition deciding means 80 functionally.

The calculation means 60 calculates, by feedback control, high potential avoidance voltage for avoiding a high potential. Specifically, when surplus power for high potential avoidance is added to the output of the fuel cell 20 to avoid the high potential, high potential avoidance voltage for avoiding the high potential is calculated by feedback control based on a deviation between the power generation voltage of the fuel cell 20 and high potential avoidance target voltage.

The determination means 70 determines whether the operating state of the fuel cell 20 corresponds to a prohibition condition A to prohibit updating of an integral term of the feedback control or a permission condition. Prohibition conditions A include: condition A1) that the required power for electric generation in the fuel cell system is higher than high potential avoidance power; condition A2) that the operating state is in an air deficiency state immediately after the stop of an intermittent operation (e.g., in two seconds after the stop of the intermittent operation); condition A3) that the vehicle is during regenerative braking or immediately after the stop of regenerative braking (e.g., in two seconds after the stop of the regenerative braking); and condition A4) that the operating state is in the process of starting up the vehicle or immediately after the start-up process (e.g., in two seconds after the start-up).

When the determination means 70 determines that the operating state of the fuel cell 20 corresponds to a prohibition condition to prohibit updating of the integral term of the feedback control, the feedback control condition deciding means 80 stops updating the integral term. On the other hand, when the determination means 70 determines that the operating state of the fuel cell 20 corresponds to the permission condition to permit updating of the integral term of the feedback control, the integral term is updated.

Figure 3:
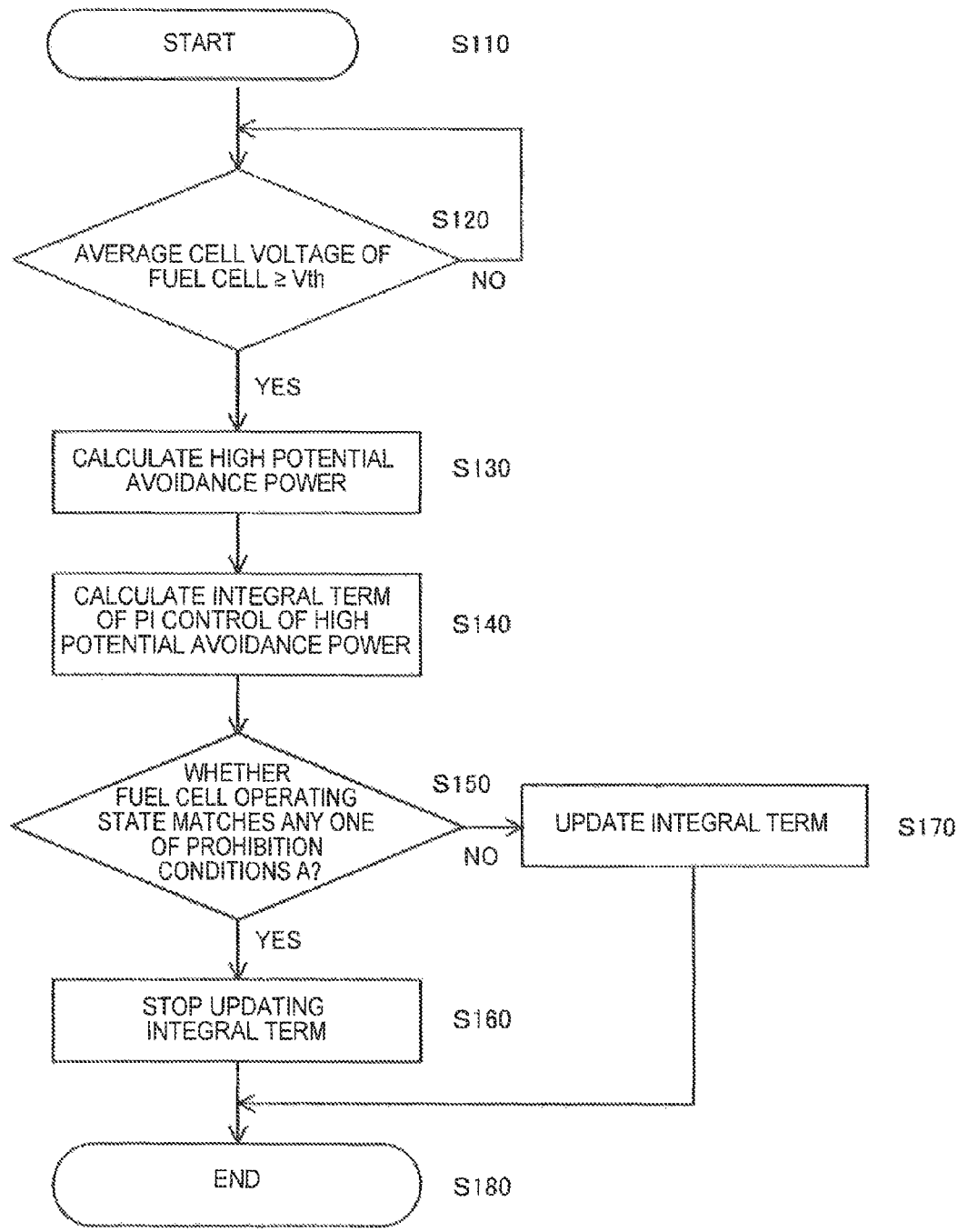
FIG. 3 is a flowchart of an operating method of the fuel cell system according to the embodiment of the present invention.

Referring next to FIG. 1 to FIG. 3, the operating method of the fuel cell system will be described together with the action of the fuel cell system according to the embodiment of the present invention. FIG. 3 is a flowchart of the operating method of the fuel cell system according to the embodiment of the present invention.

As shown in 1, when the output power of the fuel cell (fuel cell stack) 20 is higher than power required from the fuel cell 20, the fuel cell system 100 mounted in the fuel cell vehicle 10 stores the surplus power in the secondary battery 50, while when the output power of the fuel cell 20 is lower than the power required from the fuel cell 20, the secondary battery 50 supplies the shortage. In other words, power is supplied to the traction motor 30 and the like from both the fuel cell 20 and the secondary battery 50 or only from the fuel cell 20, and in a low output range with poor generating efficiency, the power generation of the fuel cell 20 is temporarily halted to supply power to the traction motor 30 and the like only from the secondary battery 50.

As shown in FIG. 3, when the operation of the fuel cell system 100 according to the embodiment is started (S110), the fuel cell system 100 is controlled by the ECU 90. The ECU 90 controls the average cell voltage of the fuel cell 20 to be less than a certain value Vth (e.g., less than 0.8 V in the embodiment) in order to improve the durability of the fuel cell 20 (S120/NO). On the other hand, when the average cell voltage of the fuel cell 20 becomes higher than or equal to the certain value Vth (e.g., 0.8 V or higher in the embodiment) (S120/YES), the calculation means 60 calculates high potential avoidance power (current) (S130).

Next, based on a deviation between the power generation voltage of the fuel cell 20 and high potential avoidance target voltage, the calculation means 60 calculates an integral term (I term) by feedback (PI) control of the high potential avoidance voltage to avoid a high potential (S140). In the feedback (PI) control, when present voltage is lower than target voltage in voltage (current) control, the high voltage avoidance power (current) is determined to be sufficiently high, and a calculation to reduce the high voltage avoidance power (current) is made in calculating the integral term (I term).

Suppose that the decrease in the average cell voltage of the fuel cell 20 is not from the effect of the calculated high potential avoidance power (current) (i.e., a decrease in voltage due to temporary deterioration of the power generation state of the fuel cell 20). In this case, however, if the high potential avoidance power (current) is reduced, sufficient high potential avoidance power (current) cannot be applied when the power generation state of the fuel cell 20 is restored, resulting in the generation of a high potential (high voltage). Therefore, when the decrease in the average cell voltage of the fuel cell 20 is caused by the decrease in voltage due to the temporary deterioration of the power generation state of the stack, the feedback control (particularly, the integration/updating of the integral term) is temporarily halted, and the temporary deterioration of the power generation state of the fuel cell 20 is determined by prohibition conditions A to be listed later.

In other words, the determination means 70 determines whether the operating state of the fuel cell 20 corresponds to a prohibition condition to prohibit updating of the integral term of the feedback control or a permission condition. Specifically, the determination means 70 determines whether the operating state of the fuel cell 20 matches any one of the following prohibition conditions A (S150).

The prohibition conditions A include: condition A1) that the required power for electric generation in the fuel cell system is higher than high potential avoidance power; condition A2) that the operating state is in an air deficiency state immediately after the stop of an intermittent operation (e.g., in two seconds after the stop of the intermittent operation); condition A3) that the vehicle is during regenerative braking or immediately after the stop of regenerative braking (e.g., in two seconds after the stop of the regenerative braking); and condition A4) that the operating state is in the process of starting up the vehicle or immediately after the start-up process (e.g., in two seconds after the start-up).

First, the condition A1 that the required power for electric generation in the fuel cell system is higher than the high potential avoidance power is made because high potential avoidance is realized by the required power for electric generation in the fuel cell system. The condition A2 that the operating state is in an air deficiency state immediately after the stop of the intermittent operation is made because high potential avoidance is realized in the air deficiency state. The condition A3 that the vehicle is during regenerative braking or immediately after the stop of regenerative braking is made because high potential avoidance is realized in an air deficiency state. The condition A4 that the operating state is in the process of starting up the vehicle or immediately after the start-up process is made because high potential avoidance is realized in an air deficiency state.

When the operating state of the fuel cell 20 matches any one of the above prohibition conditions A S150/YES), the feedback control condition deciding means 80 stops updating the integral term (S160). On the other hand, when the operating state of the fuel cell 20 matches none of the above prohibition conditions A (i.e., in the case of the permission condition) (S150 NO), the feedback control condition deciding means 80 updates the integral term (S170). Thus, surplus power for high potential avoidance is added to the output voltage of the fuel cell 20 to avoid a high potential, and then the feedback control is completed (S180).

As described above, according to the fuel cell system of the embodiment and the operating method thereof, when a decrease in average cell voltage is due to a temporary operating condition, rather than the effect of high potential avoidance power, the operating state is determined to match a prohibition condition A, and the integral term of the feedback control is not updated. This can have a beneficial effect of preventing an unnecessary error in calculating high potential avoidance power so that power for high potential avoidance can be calculated with high accuracy.

[Other Embodiments]

Although the present invention has been described above in connection with the embodiment, it should not be understood that the description and the drawings that form part of this disclosure are intended to limit this invention. Various alternative embodiments, examples, and operating techniques will be obvious to those skilled in the art from this disclosure. For example, the above embodiment assumes that the integral term of feedback control is updated by calculating high potential avoidance power, but the present invention is not limited thereto. For example, even when the system control is feed-forward control, the present invention is applicable as long as it is adequate. Further, the present invention is not limited to updating of the integral term. The present invention does not exclude updating of an addition term or the like instead of the integral term or in addition to the integral term. This is because it is only necessary to stop or allow updating an operation term that leads to an unnecessary error in calculating high potential avoidance power.

In addition, the prohibition conditions to prohibit updating of the integral term are not limited to those in the embodiment. Even any condition other than those in the embodiment can be used as a prohibition condition of the present invention as long as the condition is a temporary operating condition that leads to a decrease in cell voltage due to an effect other than the effect of high potential avoidance power.

REFERENCE NUMERALS 20 fuel cell
50 secondary battery
60 calculation means
70 determination means
80 feedback control condition deciding means
100 fuel cell system

What is claimed is:
1. A fuel cell system comprising:
a fuel cell that receives supply of reactant gas to generate power;

a secondary battery for storing part of the power generated by the fuel cell;

calculation means which, when surplus power for high potential avoidance is added to output of the fuel cell to avoid a high potential, calculates high potential avoidance voltage to avoid the high potential by feedback control based on a deviation between power generation voltage of the fuel cell and high potential avoidance target voltage;

determination means for determining whether an operating state of the fuel cell corresponds to a prohibition condition to prohibit updating of an integral term of the feedback control or a permission condition; and feedback control condition deciding means for stopping the updating of the integral term when the operating state corresponds to the prohibition condition or updating the integral term when the operating state corresponds to the permission condition.

2. The fuel cell system according to claim 1, wherein
the prohibition condition to prohibit the updating of the integral term is any one of the following conditions that:
required power for electric generation in the fuel cell system is higher than high potential avoidance power;
the operating state is in an air deficiency state immediately after stop of an intermittent operation;
a vehicle is during regenerative braking or immediately after stop of the regenerative braking; and
the operating state is in the process of starting up the vehicle or immediately after the start-up process.

3. A fuel cell system comprising:
a fuel cell that receives supply of reactant gas to generate power;
a secondary battery for storing part of the power generated by the fuel cell; and
a control unit that controls a fuel cell system,
the control unit being programmed to perform the following steps:
calculating, when surplus power for high potential avoidance is added to output of the fuel cell to avoid a high potential, high potential avoidance voltage to avoid the high potential by feedback control based on a deviation between power generation voltage of the fuel cell and high potential avoidance target voltage;
determining whether an operating state of the fuel cell corresponds to a prohibition condition to prohibit updating of an integral term of the feedback control or a permission condition; and
stopping the updating of the integral term when the operating state corresponds to the prohibition condition and updating the integral term when the operating state corresponds to the permission condition.

4. The fuel cell system according to claim 3, wherein
the prohibition condition to prohibit the updating of the integral term is any one of the following conditions that:
required power for electric generation in the fuel cell system is higher than high potential avoidance power;
the operating state is in an air deficiency state immediately after stop of an intermittent operation;
a vehicle is during regenerative braking or immediately after stop of the regenerative braking; and
the operating state is in the process of starting up the vehicle or immediately after the start-up process.

5. An operating method of a fuel cell system, in which surplus power for high potential avoidance is applied to power generation voltage of a fuel cell to avoid a high potential, comprising:
calculating, by feedback control, high potential avoidance voltage for avoiding the high potential based on a deviation between the power generation voltage of the fuel cell and high potential avoidance target voltage;
determining whether an operating state of the fuel cell corresponds to a prohibition condition to prohibit updating of an integral term of the feedback control or a permission condition; and stopping the updating of the integral term when the operating state corresponds to the prohibition condition or updating the integral term when the operating state corresponds to the permission condition to perform feedback control in order to perform high potential avoidance control.

* * * * *